United States Patent
Tso

(10) Patent No.: US 7,047,023 B1
(45) Date of Patent: May 16, 2006

(54) GPS RF FRONT END IC WITH FREQUENCY PLAN FOR IMPROVED INTEGRABILITY

(75) Inventor: Robert Tso, South San Gabriel, CA (US)

(73) Assignee: SiRF Technology, Inc., San Jose, CA (US)

(*) Notice: Subject to any disclaimer, the term of this patent is extended or adjusted under 35 U.S.C. 154(b) by 613 days.

(21) Appl. No.: 10/011,546

(22) Filed: Dec. 3, 2001

Related U.S. Application Data

(60) Provisional application No. 60/250,759, filed on Dec. 1, 2000.

(51) Int. Cl.
*H04Q 7/20* (2006.01)

(52) U.S. Cl. .............. 455/456.6; 455/260; 342/357.1; 342/357.12

(58) Field of Classification Search .......... 340/426.19, 340/539.13; 342/357.06–357.15; 701/213–216; 455/130–355, 456.1, 456.6, 255–265
See application file for complete search history.

(56) References Cited

U.S. PATENT DOCUMENTS

| | | |
|---|---|---|
| 4,426,712 A | 1/1984 | Gorski-Popiel |
| 4,445,118 A | 4/1984 | Taylor et al. |
| 4,463,357 A | 7/1984 | MacDoran |
| 4,578,678 A | 3/1986 | Hurd |
| 4,667,203 A | 5/1987 | Counselman, III |
| 4,701,934 A | 10/1987 | Jasper |
| 4,754,465 A | 6/1988 | Trimble |
| 4,785,463 A | 11/1988 | Janc et al. |
| 4,809,005 A | 2/1989 | Counselman, III |
| 4,821,294 A | 4/1989 | Thomas, Jr. |
| 4,890,233 A | 12/1989 | Ando et al. |
| 4,894,662 A | 1/1990 | Counselman |
| 4,998,111 A | 3/1991 | Ma et al. |
| 5,014,066 A | 5/1991 | Counselman, III |
| 5,036,329 A | 7/1991 | Ando |
| 5,043,736 A | 8/1991 | Darnell et al. |
| 5,108,334 A | 4/1992 | Eschenbach et al. |
| 5,202,829 A | 4/1993 | Geier |
| 5,225,842 A | 7/1993 | Brown et al. |
| 5,293,170 A | 3/1994 | Lorenz et al. |
| 5,311,195 A | 5/1994 | Mathis et al. |
| 5,323,164 A | 6/1994 | Endo |
| 5,343,209 A | 8/1994 | Sennott et al. |
| 5,345,244 A | 9/1994 | Gildea et al. |
| 5,347,536 A | 9/1994 | Meehan |
| 5,379,224 A | 1/1995 | Brown et al. |
| 5,402,347 A | 3/1995 | McBurney et al. |
| 5,416,712 A | 5/1995 | Geier et al. |
| 5,420,593 A | 5/1995 | Niles |
| 5,440,313 A | 8/1995 | Osterdock et al. |
| 5,450,344 A | 9/1995 | Woo et al. |
| 5,504,684 A | 4/1996 | Lau et al. |

(Continued)

FOREIGN PATENT DOCUMENTS

EP    WO 90/11652    10/1990

(Continued)

*Primary Examiner*—Curtis Kuntz
*Assistant Examiner*—Matthew C Sams

(57) ABSTRACT

A GPS RF Front End IC using a single conversion stage, which is immune from self jamming from clock signal harmonics generated internally or from dominant clock signal harmonics generated externally by the subsequent baseband GPS processor which uses a clock of 48•fo for GPS processing. The improved frequency plan reduces the problems of interference when the integration of the RF and Baseband functions is required in the form of a single-chip, or as 2 individual chips on a common substrate.

6 Claims, 1 Drawing Sheet

U.S. PATENT DOCUMENTS

| | | | |
|---|---|---|---|
| 5,535,432 A * | 7/1996 | Dent .......................... 455/77 |
| 5,572,168 A * | 11/1996 | Kasturia ....................... 331/2 |
| 5,589,833 A * | 12/1996 | Randall et al. ............. 342/195 |
| 5,592,173 A | 1/1997 | Lau et al. |
| 5,625,668 A | 4/1997 | Loomis et al. |
| 5,663,734 A | 9/1997 | Krasner |
| 5,663,735 A | 9/1997 | Eshenbach |
| 5,781,156 A | 7/1998 | Krasner |
| 5,786,789 A | 7/1998 | Janky |
| 5,812,087 A | 9/1998 | Krasner |
| 5,812,591 A * | 9/1998 | Shumaker et al. .......... 375/147 |
| 5,825,327 A | 10/1998 | Krasner |
| 5,828,694 A | 10/1998 | Schipper |
| 5,831,574 A | 11/1998 | Krasner |
| 5,841,396 A | 11/1998 | Krasner |
| 5,845,203 A | 12/1998 | LaDue |
| 5,854,605 A | 12/1998 | Gildea |
| 5,874,914 A | 2/1999 | Krasner |
| 5,877,724 A | 3/1999 | Davis |
| 5,877,725 A | 3/1999 | Kalafus |
| 5,883,594 A | 3/1999 | Lau |
| 5,884,214 A | 3/1999 | Krasner |
| 5,889,474 A | 3/1999 | LaDue |
| 5,897,605 A * | 4/1999 | Kohli et al. ................ 701/213 |
| 5,903,654 A | 5/1999 | Milton et al. |
| 5,907,809 A | 5/1999 | Molnar et al. |
| 5,917,444 A | 6/1999 | Loomis et al. |
| 5,920,283 A | 7/1999 | Shaheen et al. |
| 5,923,703 A | 7/1999 | Pon et al. |
| 5,926,131 A | 7/1999 | Sakumoto et al. |
| 5,936,572 A | 8/1999 | Loomis et al. |
| 5,943,363 A | 8/1999 | Hanson et al. |
| 5,945,944 A | 8/1999 | Krasner |
| 5,963,582 A | 10/1999 | Stansell, Jr. |
| 5,977,909 A | 11/1999 | Harrison et al. |
| 5,982,324 A | 11/1999 | Watters et al. |
| 5,987,016 A | 11/1999 | He |
| 5,999,124 A | 12/1999 | Sheynblat |
| 6,002,362 A | 12/1999 | Gudat |
| 6,002,363 A | 12/1999 | Krasner |
| 6,009,551 A | 12/1999 | Sheynblat |
| 6,016,119 A | 1/2000 | Krasner |
| 6,041,222 A | 3/2000 | Horton et al. |
| 6,047,017 A | 4/2000 | Cahn et al. |
| 6,052,081 A | 4/2000 | Krasner |
| 6,061,018 A | 5/2000 | Sheynblat |
| 6,064,336 A | 5/2000 | Krasner |
| 6,091,785 A * | 7/2000 | Lennen ...................... 375/316 |
| 6,104,338 A | 8/2000 | Krasner |
| 6,104,340 A | 8/2000 | Krasner |
| 6,107,960 A | 8/2000 | Krasner |
| 6,111,540 A | 8/2000 | Krasner |
| 6,131,067 A | 10/2000 | Girerd et al. |
| 6,133,871 A | 10/2000 | Krasner |
| 6,133,873 A | 10/2000 | Krasner |
| 6,133,874 A | 10/2000 | Krasner |
| 6,150,980 A | 11/2000 | Krasner |
| 6,252,543 B1 * | 6/2001 | Camp .................... 342/357.06 |
| 6,704,558 B1 * | 3/2004 | Sorrells et al. ............. 455/323 |
| 6,931,233 B1 * | 8/2005 | Tso et al. .................. 455/12.1 |

FOREIGN PATENT DOCUMENTS

| | | |
|---|---|---|
| EP | 0511741 | 11/1992 |
| GB | 2115195 | 1/1983 |
| JP | 58-105632 | 6/1983 |
| JP | 7-36035 | 5/1986 |
| JP | 4-326079 | 11/1992 |

* cited by examiner

GPS RF FRONT END IC WITH FREQUENCY PLAN FOR IMPROVED INTEGRABILITY

CROSS-REFERENCE TO RELATED APPLICATIONS

This application claims priority under 35 U.S.C. § 119(e) of U.S. Provisional Patent Application No. 60/250,759, filed Dec. 1, 2000, entitled "GPS RF FRONT END IC WITH FREQUENCY PLAN FOR IMPROVED INTEGRABILITY," by Robert Tso, which application is incorporated by reference herein.

BACKGROUND OF THE INVENTION

1. Field of the Invention

The present invention relates in general to Global Positioning System (GPS) receivers, and in particular to a GPS Radio Frequency (RF) front end Integrated Circuit (° C.) with a frequency plan for improved integrability.

2. Description of the Related Art

The design choice of using a relatively high clock frequency such as 48•fo for GPS processing allows speed advantages in minimizing GPS signal acquisition time-to-first-fix and reacquisition. As an example, U.S. Pat. No. 5,897,605, which is herein incorporated by reference, teaches such techniques for a GPS Processor ASIC. Unfortunately, significant harmonic power of the clock at a frequency near the GPS satellite carrier will exist and tend to jam or desensitize the GPS RF Front End. Specifically, for the case of a 48•fo clock, where fo=1.023 MHz, the $32^{nd}$ harmonic of such a clock lies at 1536•fo, which is only 4•fo below the GPS signal at 1540•fo. If the frequency plan of the receiver is not chosen judiciously, then the aforementioned $32^{nd}$ harmonic will not be rejected by the RF or IF filter of the RF Front End IC, and loss of receiver sensitivity may result.

It can be seen, then, that there is a need in the art for a GPS receiver that has a frequency plan that will avoid self-jamming problems due to harmonics of the clock frequency.

SUMMARY OF THE INVENTION

To minimize the limitations in the prior art, and to minimize other limitations that will become apparent upon reading and understanding the present specification, the present invention discloses a method and apparatus for providing an RF front end to a GPS receiver that has a frequency plan that makes the RF front end easier to integrate with the baseband processing circuitry.

A GPS RF front end integrated circuit in accordance with the present invention comprises input means for accepting a 13 MHz reference signal, a voltage controlled oscillator (VCO) providing a Local Oscillator (LO) signal near 1536•fo, a divide-by-4 prescaler, a Programmable Modulus (PM) divider, an accumulator coupled to the input of the PM divider, comprising an overflow bit which controls the selectable divider, wherein the overflow bit is used to provide a time averaged divide ratio of about 30.21875, registers coupled to the addend input of the accumulator and the output sum of the accumulator, mixers for providing an image reject mixer function, IF filters having a center frequency of 4•fo and high attenuation near dc, an IF combiner circuit to effect image rejection by phase shifting and summation a divide-by-8 counter to synthesize a CLKGPS signal, a divide-by-3 counter to synthesize a CLKACQ signal, a linear AGC function, and an A/D converter which provides a sampled, digital representation of the IF signal.

It is an object of the present invention to provide a GPS receiver that has a frequency plan that will avoid or mitigate performance degradation due to harmonic signals of the clock getting coupled into the RF signal path of the GPS receiver.

BRIEF DESCRIPTION OF THE DRAWINGS

Referring now to the drawings in which like reference numbers represent corresponding parts throughout.

DETAILED DESCRIPTION OF THE DRAWINGS

Figure 1:
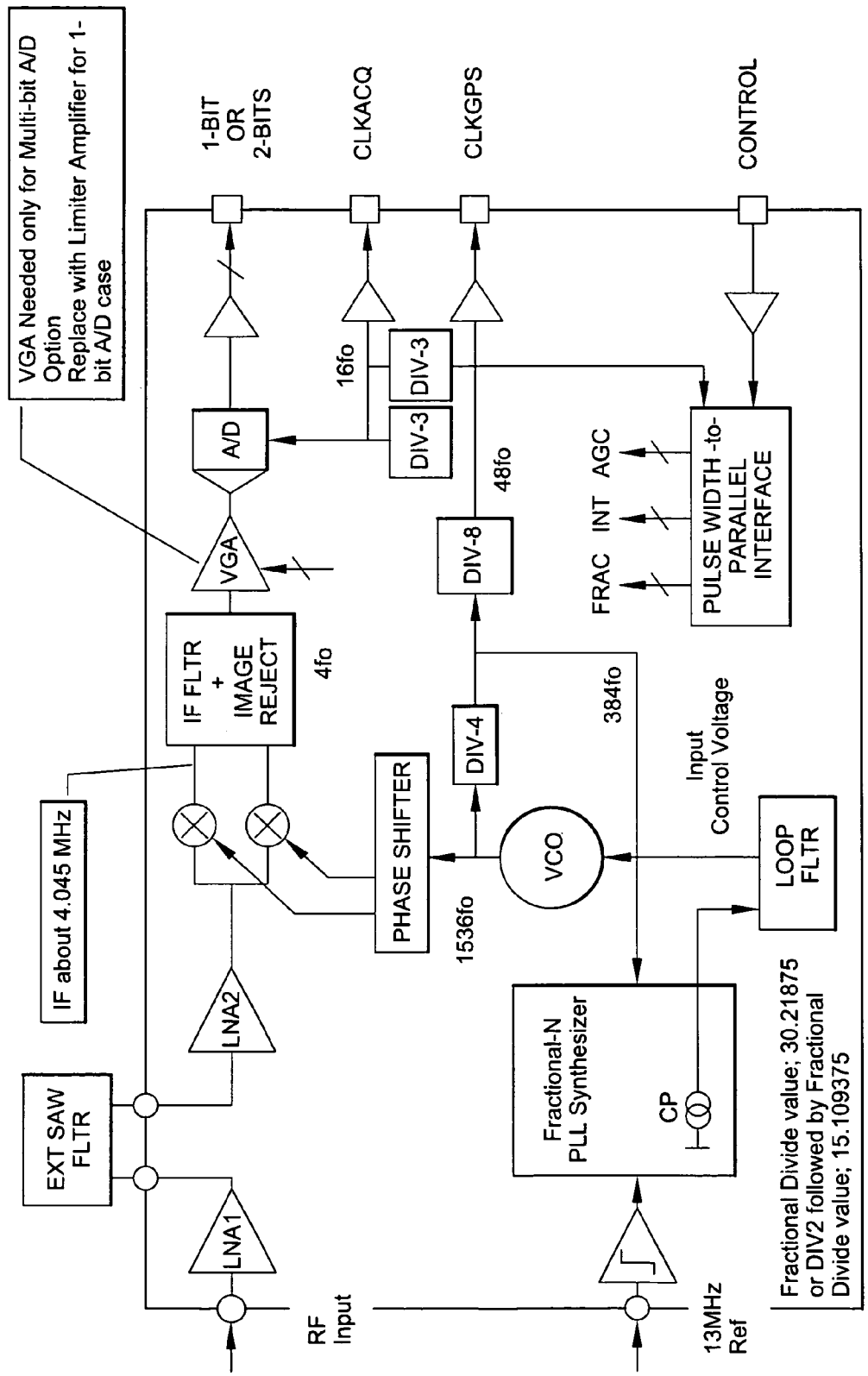
FIG. 1 illustrates a schematic of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention, as shown in FIG. 1, teaches a frequency plan for the RFIC which provides the clock signals as required by the Baseband GPS Processor ASIC. The present invention teaches how this frequency plan is advantageous for low power operation and immunity from self-jamming.

For convenience, these clock signals are named as CLKGPS for the GPS processing clock, at a frequency of 48•fo, and CLKACQ for data acquisition clock, at a frequency of 16•fo. The IF center frequency of the IF bandpass filter is 4•fo. A relatively low IF center frequency is advantageous to ease the difficulty of implementing the IF filter on-chip using standard semiconductor processes. With the sample rate being 4 times the IF center frequency, the subsequent downconversion of I, Q, -I, -Q samples to baseband is simplified to merely commutation and sign inversion, which is advantageous for low power operation. Also, the CLKACQ is easily synthesized from CLKGPS, by using a divide-by-3 circuit.

The CLKGPS is synthesized from the FLO by using a divide-by-32. Note that divide-by-32 can be implemented as a cascade of 5 asynchronous divide-by-two flip-flops, which is advantageous for low power operation. The frequency of FLO is at 1536•fo, which is the same frequency as the $32^{nd}$ harmonic of CLKGPS. This is advantageous, since leakage of this clock harmonic signal into the RF path would get down converted to dc, which is easily rejected by the IF filters following the mixer function, and no loss in receiver sensitivity would result. Furthermore, the present invention teaches the synthesis of the FLO signal by using a fractional-N type synthesizer based on an input reference of 13 MHz. This frequency is selected since it is commonly used as the reference frequency in GSM mobile phones. This is advantageous in cases where the invention herein is integrated onto the GSM mobile phone platform, since crystal derived signals such as a the reference may then be shared. In one embodiment, a DIV30/31 is used to obtain a fractional divide ratio of 30.21875, while in a $2^{nd}$ embodiment, a DIV15/16 is used to achieve a fractional divide ratio of 15.109375. The required size of the digital adder in the accumulator is 5 bits and 6 bits respectively. This is a relatively small sized accumulator and takes up little chip area and power. In addition, the use of word length of 5 or 6 bits in the accumulator results in the LO having a frequency offset of +47 kHz results. To simplify the GPS receiver software, it is advantageous to have a moderate frequency offset from zero, which avoids having the apparent doppler frequency changing polarity due to drifts in the reference crystal or to actual satellite doppler.

Specifics of the Invention

The GPS RF signal is coupled to an RF LNA, the output is coupled to an RF bandpass filter. The output of this is coupled to another RF amplifer, or coupled to the RF inputs of the 2 mixers, and the VCO provides an LO signal to a phase shifter which generates LO-I and LO-Q quadrature signals, or alternatively, such signals are generated directly by the VCO. These quadrature LO signals are coupled to the LO inputs of the 2 mixers. The IF outputs of the 2 mixers are coupled to IF filters. The outputs of the IF fitlers are coupled to an Image Reject combiner circuit. The output of the combiner is coupled to an IF amplifier stage, being either a linear variable gain amplifier, or a limiting type amplifier. The output of the IF amplifier is coupled to an A/D converter. The output of the A/D converter is coupled to one output buffer (SIGN) for a 1-bit case. In the case of 2-bit quantization, there is another A/D output which is coupled to and output buffer (Magnitude).

The Reference signal is coupled to "R" input of the Phase/Frequency detector (PFD) of the synthesizer. The PFD outputs couple to a charge pump (CP) circuit. The CP couples to a Loop Filter (LF). The LF couples to the control input of the VCO. The output of the VCO is coupled to the LO ports of the mixers, as described above. The output of the VCO is also coupled to the prescaler. The output of the prescaler is coupled to a N/N+1 divider, which can divide by N or N+1. In this invention, we teach the cases where N=30, or N=15 if an additional Divide-by-2 is used. The output of the N/N+1 divider is coupled to the "V" input of the PFD. In another path, the output of the prescaler is also coupled to the input of a Divide-8 circuit (DIV8). The output of DIV8 is used to obtain the CLKGPS signal. The output of DIV8 is coupled to the input of a divide-by-3 circuit (DIV3). The output of DIV3 is used to obtain the CLKACQ signal, which is used by the A/D as a sampling clock, and by the GPS ASIC as a data registration clock.

In summary, the present invention provides a GPS RF front end integrated circuit. A GPS RF front end circuit in accordance with the present invention comprises input means for accepting a 13 MHz reference signal, a voltage controlled oscillator (VCO) providing a Local Oscillator (LO) signal near 1536•fo, a divide-by-4 prescaler, a Programmable Modulus (PM) divider, an accumulator coupled to the input of the PM divider, comprising an overflow bit which controls the selectable divider, wherein the overflow bit is used to provide a time averaged divide ratio of about 30.21875, registers coupled to the addend input of the accumulator and the output sum of the accumulator, mixers for providing an image reject mixer function, IF filters having a center frequency of 4•fo and high attenuation near dc, an IF combiner circuit to effect image rejection by phase shifting and summation a divide-by-8 counter to synthesize a CLKGPS signal, a divide-by-3 counter to synthesize a CLKACQ signal, a linear AGC function, and an A/D converter which provides a sampled, digital representation of the IF signal.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A GPS RF front end integrated circuit, comprising:
   input means for accepting a 13 MHz reference signal;
   a voltage controlled oscillator (VCO having an input, the VCO providing a Local Oscillator (LO) signal of approximately 1536 fo,
   a divide-by-4 prescaler, having an input coupled to the VCO output;
   a Programmable Modulus (PM) divider, having an input;
   an accumulator, having an addend input and an output sum, the accumulator being coupled to the input of the PM divider, comprising an overflow bit which controls the selectable divider, wherein the overflow bit is used to provide a time averaged divide ratio of 30.21875;
   a first register coupled to the addend input of the accumulator;
   a second register coupled to the output sum of the accumulator;
   a first mixer and a second mixer for providing an image reject mixer function;
   a first IF filter and a second IF filter, each having a center frequency of 4 fo and each having high attenuation near dc;
   an IF combiner circuit to effect image rejection by phase shifting and summation;
   a divide-by-8 counter to synthesize a CLKGPS signal;
   a divide-by-3 counter to synthesize a CLKACQ signal;
   a linear AGC function; and
   an A/D converter which provides a sampled, digital representation of the IF signal.

2. The GPS RF front end circuit of claim 1, wherein the selectable divider can be selected to perform a divide-by-30 function or a divide-by-31 function.

3. The GPS RF front end circuit of claim 2, wherein the accumulator comprises at least 5 bits.

4. The GPS RF front end of claim 3, wherein the overflow bit controls the selection of the divide-by-30 function or the divide-by-31 function of the selectable divider.

5. The GPS RF front end of claim 4, wherein the CLKGPS signal has a frequency at a value of 48 fo.

6. The GPS RF front end of claim 5, wherein the CLKACQ signal has a frequency at a value of 16 fo.

* * * * *